(12) United States Patent
Yung et al.

(10) Patent No.: US 6,304,961 B1
(45) Date of Patent: *Oct. 16, 2001

(54) COMPUTER SYSTEM AND METHOD FOR FETCHING A NEXT INSTRUCTION

(75) Inventors: Robert Yung, Fremont; Kit Sang Tam, San Bruno; Alfred K. W. Yeung, San Francisco, all of CA (US); William N. Joy, Aspen, CO (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/800,367

(22) Filed: Feb. 14, 1997

Related U.S. Application Data

(63) Continuation of application No. 08/363,107, filed on Dec. 22, 1994, now abandoned, which is a continuation of application No. 07/938,371, filed on Aug. 31, 1992, now abandoned.

(51) Int. Cl.$^7$ .................................................. G06F 9/00
(52) U.S. Cl. ............................................................ 712/238
(58) Field of Search ........................... 395/800, 375, 395/384, 584, 585, 800.01, 800.23; 711/125, 213; 712/1, 23, 238, 207, 237

(56) References Cited

U.S. PATENT DOCUMENTS

| | | | |
|---|---|---|---|
| 4,228,498 | 10/1980 | Moshier ............................... | 395/282 |
| 4,435,756 | 3/1984 | Potash ................................... | 395/375 |
| 4,437,149 | * 3/1984 | Pomerene et al. ................... | 395/375 |
| 4,894,772 | 1/1990 | Langendorf .......................... | 395/375 |
| 5,129,067 | * 7/1992 | Johnson ............................... | 395/375 |
| 5,136,697 | * 8/1992 | Johnson ............................... | 395/375 |
| 5,226,130 | 7/1993 | Favor et al. ......................... | 395/375 |
| 5,230,068 | 7/1993 | Van Dyke et al. .................. | 395/375 |
| 5,265,213 | 11/1993 | Weiser et al. ........................ | 395/375 |
| 5,367,694 | * 11/1994 | Ueno .................................... | 395/375 |
| 5,381,533 | * 1/1995 | Peleg et al. .......................... | 395/375 |
| 5,481,751 | * 1/1996 | Alpert et al. ......................... | 395/800 |
| 5,832,259 | * 11/1998 | Stiles .................................... | 395/585 |

FOREIGN PATENT DOCUMENTS

| | | |
|---|---|---|
| 0381 444 A2 | 1/1990 | (EP) . |
| 0401 992 A2 | 5/1990 | (EP) . |

OTHER PUBLICATIONS

"The Hardware Architecture of the CRISP Microprocessor" by Ditzel et al., 1987 ACM.

Manolis G. H. Katevenis, "Reduced Instruction Set Computer Architecture for VLSI",1984, pp. 150–158, ACM Doctoral Dissertation.

Linley Gwennap, "Desktop Market Will Open—Slowly", Jan. 24,1994, p. 3, The Editor's View, Microprocessor Report.

Linley Gwennap, "PA–7200 Enables Inexpensive MP Systems", Mar. 7, 1994, pp. 12–15, Microprocessor Report.

* cited by examiner

*Primary Examiner*—John A. Follansbee
(74) *Attorney, Agent, or Firm*—Finnegan, Henderson, Farabow, Garrett & Dunner, L.L.P.

(57) ABSTRACT

The invention relates to a computer system and method for fetching a next instruction. In one embodiment, a computer system includes an instruction cache, a next fetch address register, and a fetch unit. The instruction cache includes an instruction array for storing a plurality of processor instructions and a next address fetch array for storing at least one next fetch address. Each next fetch address associated with at least one of the processor instructions stored in the instruction array and indicating a location of a processor instruction to be fetched. In another embodiment, an apparatus includes a first device configured to fetch a first instruction stored in an instruction cache, a second device configured to unconditionally store a next fetch address associated with the first instruction, and a third device configured to unconditionally fetch a second instruction stored at a location indicated by the stored next fetch address.

25 Claims, 7 Drawing Sheets

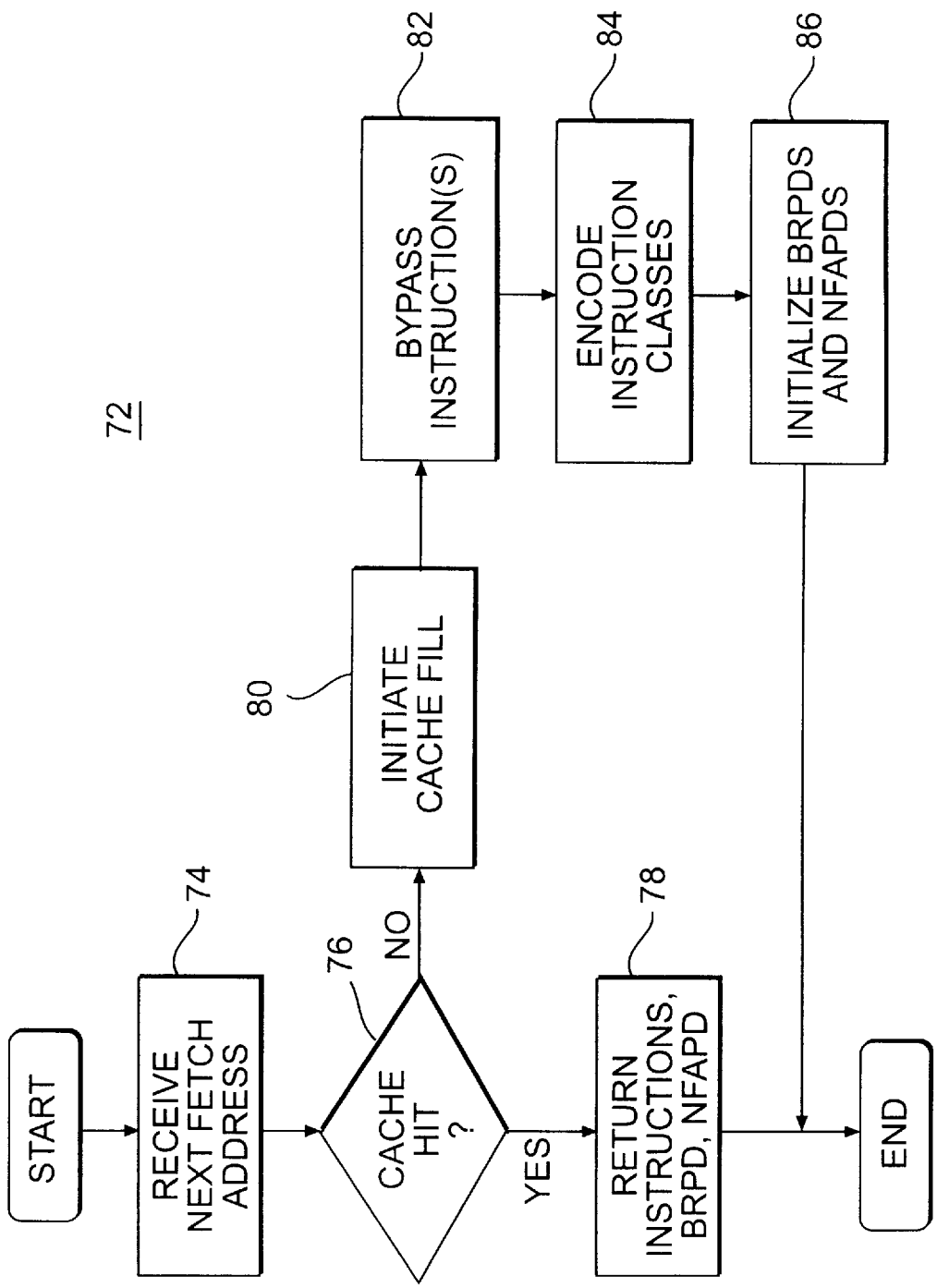

| INSTRUCTIONS 4 3 2 1 | BRPD FIELDS 40 | NFAPD FIELDS 42 |
|---|---|---|
| 0 0 0 0 | 0 | next seq. addr |
| 0 0 0 1 | 0 | next seq. addr |
| 0 0 1 1 | 1 | target addr 1 |
| 0 1 0 1 | 0 | next seq addr |
| 0 1 0 1 | 1 | target addr 1 |
| 0 1 0 1 | 1 | target addr 3 |
| 0 1 0 1 | 1 | target addr 1 |

COMPUTER SYSTEM AND METHOD FOR FETCHING A NEXT INSTRUCTION

This is a continuation of application Ser. No. 08/363,107, filed Dec. 22, 1994 now abandoned.

BACKGROUND OF THE INVENTION

1. Related Application

The present application which is a continuation application of, commonly assigned application Ser. No. 07/938,371 entitled "A Computer System Having a Minimum Latency Cache Which Stores Partially Decoded Instructions, Branch Prediction and Next Fetch Address Prediction Information," filed Aug. 31, 1992, now abandoned and incorporated in its entirety by reference herein.

2. Field Of Invention

The present invention relates to the field of computer systems. More specifically, the present invention relates to a computer system having a minimum latency cache which stores instructions decoded to determine class, branch prediction and next fetch address prediction information.

BACKGROUND

Historically, when a branch instruction was dispatched in a computer system, instruction fetching and dispatching were stalled until the branch direction and the target address were resolved. Since this approach results in lower system performance, it is rarely used in modern high performance computers. To obtain higher system performance, various techniques have been developed to allow instruction fetching and dispatching to continue in an efficient manner without waiting for the resolution of the branch direction. Central to the efficiency of continuing instruction prefetching and dispatching is the ability to predict the correct branch direction. There are several common approaches to predicting branch direction:

1. Static prediction: Under this approach, the higher probability direction for a particular branch instruction is ascertained. When the branch instruction is fetched, the ascertained direction is always taken. For example, a direction for a branch instruction maybe set to "Branch Taken", or alternatively, set to "Branch Not Taken".

2. Dynamic software prediction: Under this approach, a branch prediction algorithm predicts the branch direction.

3. Dynamic hardware prediction: Under this approach, a branch prediction algorithm predicts the branch direction based on the branch history information maintained in a branch prediction table.

The static prediction approach is simple to implement, however, its prediction hit rate is generally less than 75%. Such a prediction hit rate is generally too low for high performance computers. The dynamic software prediction approach generally works quite well when used in conjunction with a compilation technique known as trace scheduling. Without trace scheduling, the prediction hit rate is generally very low. Unfortunately, trace scheduling is difficult to apply to some programs and implementations. The dynamic hardware prediction generally provides an adequate prediction hit rate. However, it increases the complexity of the processor design and requires additional hardware to maintain the separate branch prediction table. Further, if the size of a cache is enlarged in a redesign, the size of the table would also have to be increased, complicating the redesign process.

SUMMARY OF THE INVENTION

The present invention relates to a novel computer system. The computer system includes a low latency cache that stores instructions decoded to determine class, branch prediction information, and next address fetch information.

The present invention includes a cache having a plurality of cache lines. Each cache line includes (n) instructions and (n) instruction class (ICLASS) fields for storing the decoded class information of the instructions respectively. Each cache line also includes one or more branch prediction (BRPD) fields and one or more next fetch address prediction (NFAPD) fields.

When an instruction is fetched, the corresponding ICLASS field, BRPD field information and the NFAPD information are all provided to the prefetch and dispatch unit of the computer system. The ICLASS information informs the prefetch unit if the fetched instruction is a branch. Since the instruction has already been partially decoded, the need to perform a partial decode in the prefetch and dispatch unit to determine if an instruction is a branch instruction is avoided. If the instruction is a branch instruction, the BRPD field provides a prediction of either "Branch Taken" or "Branch Not Taken". For non-branch instructions, the BRPD field is ignored. For non-branch instructions, the NFAPD typically contains the next sequential address. For branch instructions, the NFAPD contains either the next sequential address or the target address of the branch instruction. If the BRPD field contains a "Branch Taken" prediction, the corresponding NFAPD field typically contains the target address for the branch instruction. Alternatively, if the BRPD field contains a "Branch Not Taken" status, the corresponding NFAPD field typically contains the next sequential address. In any event, the NFAPD information is used to define the next line from the cache to be fetched, thereby avoiding the need to calculate the next fetch address in the prefetch unit. The prefetch and dispatch unit needs to calculate the next fetch address only when a misprediction of a branch instruction occurs. An update policy is used to correct the BRPD and the NFAPD values in the event the predictions turn out to be wrong.

The number of BRPD fields and NFAPD fields per cache line varies depending on the specific embodiment of the present invention. In one embodiment, a specific BRPD field and an NFAPD field is provided for each instruction per cache line. If there is more than one branch instruction per cache line, each branch instruction enjoys the benefit of a dedicated branch prediction and next fetch address prediction. In a simplified embodiment, one BRPD field and one NFAPD field is shared among all the instructions per cache line. Under these circumstances, only a dominant instruction in the cache line makes use of the BRPD and the NFAPD information. A dominant instruction is defined as the first branch instruction with a "Branch Taken" status in the cache line. For example, with a dominant instruction, the BRPD field is set to "Branch Taken", and the NFAPD typically contains the target address for the dominant branch instruction. When the instruction is fetched, control is typically transferred to the target address of the dominant instruction. Since the dominant instruction is the first instruction in a cache line to cause a control transfer, it is not necessary for the other instructions in the cache line to have their own BRPD fields and NFAPD fields respectively.

The present invention represents a significant improvement over the prior art. The need to perform a partial decode or a next fetch address calculation in the prefetch and dispatch unit is eliminated with a vast majority of the fetched instructions. As such, fetch latency is significantly reduced and processor throughput is greatly enhanced.

DESCRIPTION OF THE DRAWINGS

The objects, features and advantages of the system of the present invention will be apparent from the following detailed description of the invention with references to the drawings in which:

FIG. 5 is a flow diagram illustrating the operation of the instruction cache.

FIG. 6 illustrates exemplary line entries in the instruction cache used in the computer system of the present invention.

DESCRIPTION OF THE PREFERRED EMBODIMENT

Figure 1:
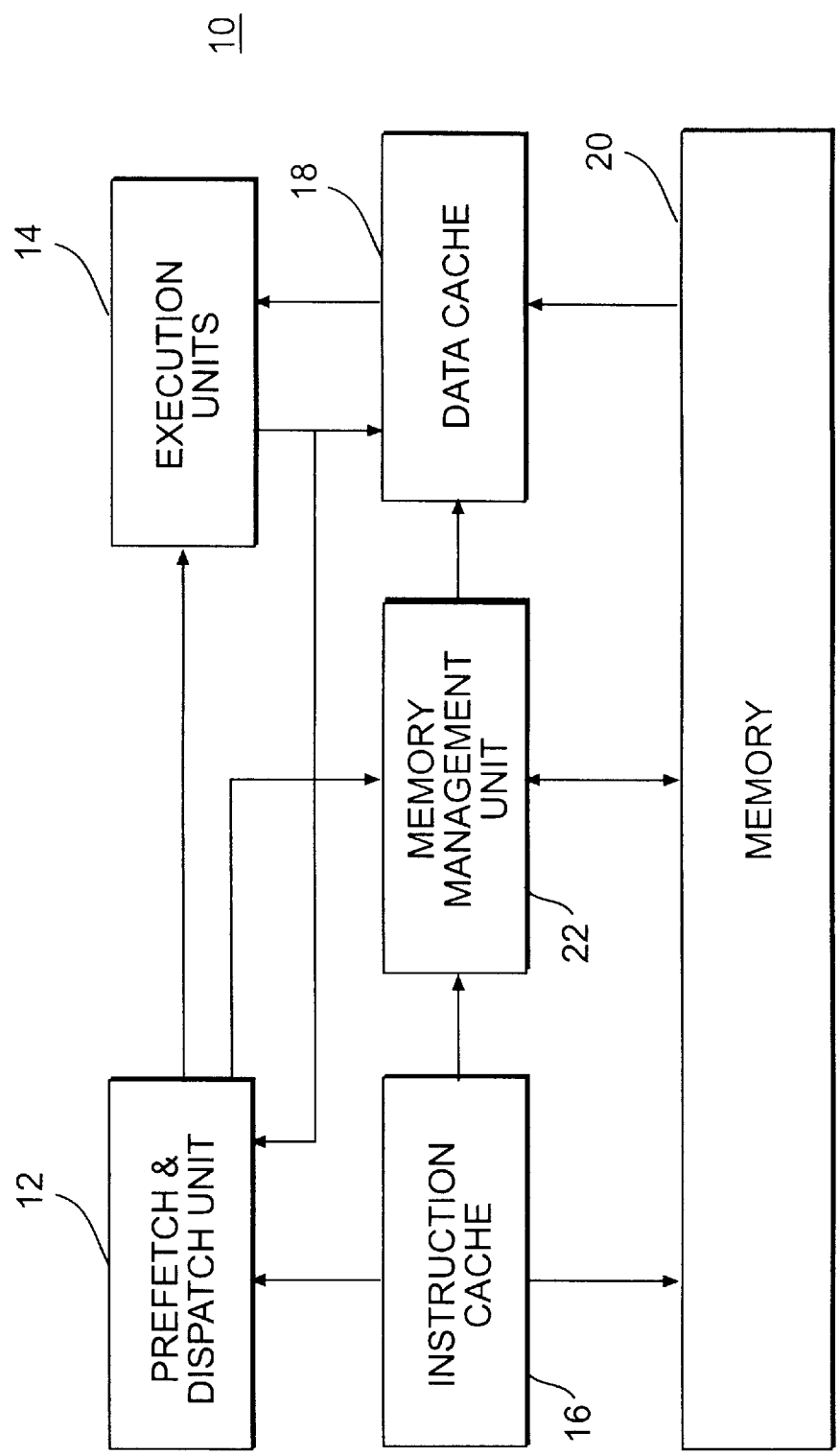
FIG. 1 is a block diagram of a computer system according to the present invention.

Referring to FIG. 1, a functional block diagram illustrating a computer system of the present invention is shown. The computer system 10 includes an instruction prefetch and dispatch unit 12, execution units 14, an instruction cache 16, a data cache 18, a memory unit 20 and a memory management unit 22. The instruction cache 16 and data cache 18 are coupled to the instruction prefetch and dispatch unit 12, the execution units 14, and the memory management unit 22 respectively. The prefetch and dispatch unit 12 is coupled to the execution units 14 and the memory management unit 22. The data cache 18 is coupled to memory 20. The instruction cache 16 is coupled to memory 20.

Cooperatively, the memory management unit 22 and the prefetch and dispatch unit 12 fetch instructions from instruction cache 16 and data from the data cache 18 respectively and dispatch them as needed to the execution units 14. The results of the executed instructions are then stored in the data cache 18 or main memory 20. Except for the instruction prefetch and dispatch unit 12, and the instruction cache 16, the other elements, 14 and 18 through 22, are intended to represent a broad category of these elements found in most computer systems. The components and the basic functions of these elements 14, and 18 through 22 are well known and will not be described further. It will be appreciated that the present invention may be practiced with other computer systems having different architectures. In particular, the present invention may be practiced with a computer system having no memory management unit 22. Furthermore, the present invention may be practiced with a unified instruction/data cache or an instruction cache only.

Figure 2:
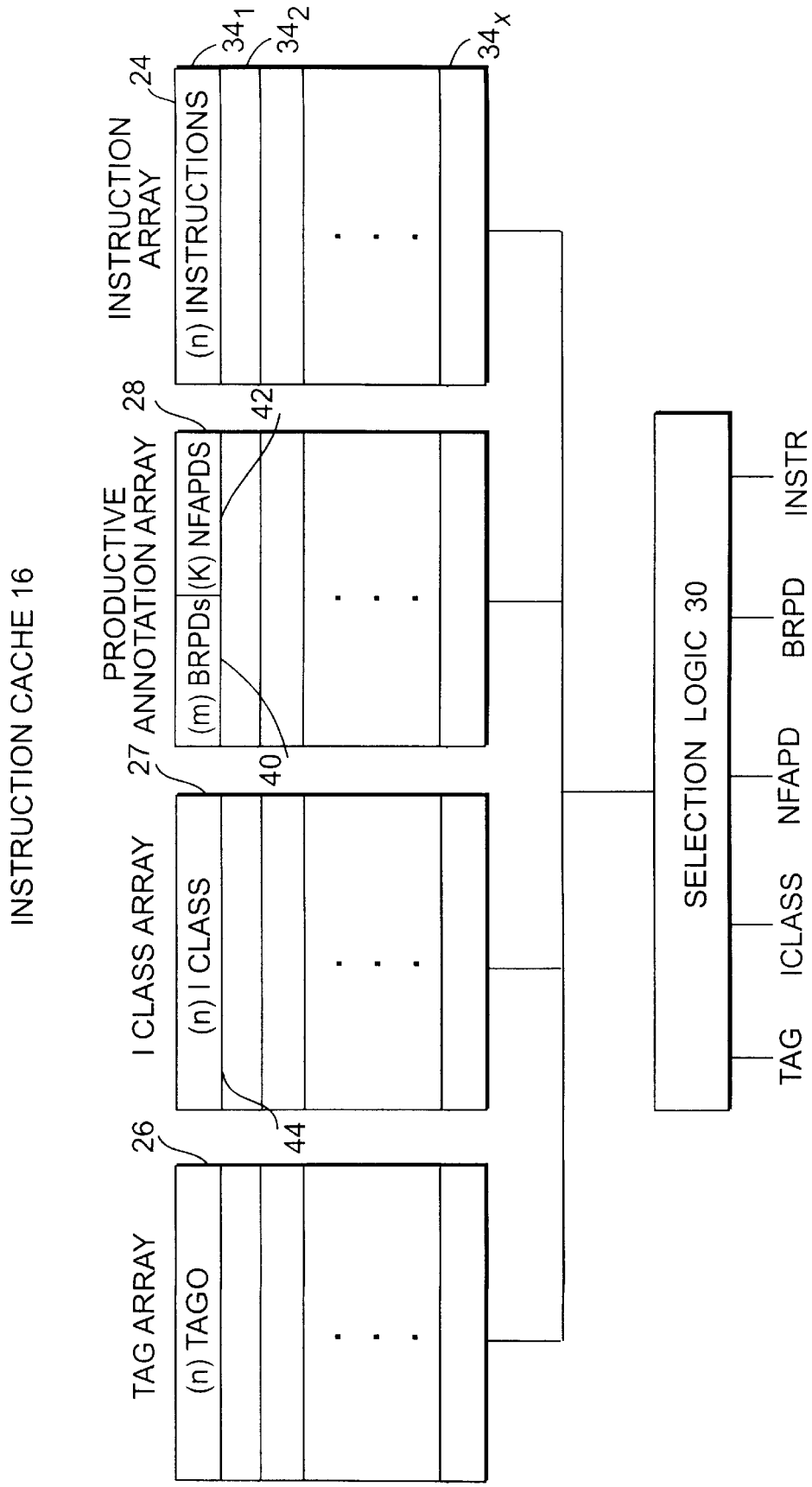
FIG. 2 illustrates a block diagram of an instruction cache in the computer system of the present invention.

Referring now to FIG. 2, a block diagram illustrating the instruction cache 16 of the present invention is shown. The instruction cache 16 includes an instruction array 24, a tag array 26, an ICLASS array 27, a predictive annotation array 28, and selection logic 30. The cache is segmented into a plurality of cache lines $34_1$ through $34_x$. Each cache line 34 includes (n) instructions in the instruction array 24, (m) branch prediction BRPD fields 40, (k) next address prediction NFAPD fields 42 in the predictive annotation array 28, (n) ICLASS fields 44 in the ICLASS array 27, and (n) tags in the tag array 26. It also should be noted that the instruction cache 16 may be set associative. With such an embodiment, individual arrays 24 through 29 are provided for each set in the instruction cache 16.

Each of the (n) instructions per cache line 34 contained in the instruction cache 16 are decoded to determine their class. In one embodiment, the instructions are decoded by decoder 17 and the instruction class encodings are stored in the appropriate ICLASS field 44, when the cache line 34 is being brought into the instruction cache 16. In an alternative embodiment, the instruction class encodings are stored before the cache line 34 is brought into the instruction cache 16. Examples of instruction classes are the program counter (PC) relative branch, register indirect branch, memory access, arithmetic and floating point.

When the instruction cache 16 receives a next fetch address from the instruction prefetch and dispatch unit 12, the appropriate cache line 34 is accessed. The (n) instructions, the (m) BRPD fields 40, the (k) NFAPD fields 42, the (n) ICLASS fields 44, and the corresponding tag information, of the cache line are provided to the selection logic 30. In the event the instruction cache 16 includes more than one set, then the selection logic 30 selects the proper line from the plurality of sets. With embodiments having only a single set, the selection logic 30 simply passes the accessed line 34 to the instruction prefetch and dispatch unit 12. The set selection logic 30 is intended to represent a broad category of selection logic found in most computer systems, including the selection logic described in U.S. patent application Ser. No. 07/906,699, filed on Jun. 30, 1992, entitled Rapid Data Retries From A Data Storage Using Prior Access Predictive Annotation, assigned to the same assignee of the present invention now U.S. Pat. No. 5,392,414.

The BRPD fields 40 and NFAPD fields 42 are initialized in accordance with a pre-established policy when a cache line 34 is brought into the cache 16. When an instruction is fetched, the corresponding ICLASS field 44 information, BRPD field 40 information and the NFAPD field 42 information are all provided to the prefetch and dispatch unit 12. Since the instruction has already been decoded to determine class, the need to perform a full decode in the prefetch and dispatch unit 12 to determine if an instruction is a branch instruction is avoided. If the instruction is a non-branch instruction, the BRPD information is ignored. The NFAPD information, however, provides the next address to be fetched, which is typically the sequential address of the next line in the instruction cache 16. If a predecoded instruction is a branch instruction, the corresponding BRPD field 40 contains either a "Branch Taken" or a "Branch Not Taken" prediction and the NFAPD field 42 contains a prediction of either the target address of the branch instruction or the sequential address of the next line 34 in the instruction cache 16. Regardless of the type of instruction, the predicted next address is used to immediately fetch the next instruction.

After a branch instruction is fetched, an update policy is used to update the entries in the corresponding BRPD field 40 and the NFAPD field 42 when the actual direction of the branch instruction and the actual next fetch address is resolved in the execution units 14. If the branch prediction and next fetch address prediction were correct, execution continues and the BRPD field 40 or the NFAPD field 42 are not altered. On the other hand, if either prediction is wrong, the BRPD field 40 and the NFAPD field 42 are updated as needed by the prefetch and dispatch unit 12. If the misprediction caused the execution of instructions down an incorrect branch path, execution is stopped and the appropriate execution units 14 are flushed. Execution of instructions thereafter resumes along the correct path. The next time the same instruction is fetched, a branch prediction decision is made based on the updated branch prediction information in the BRPD field 40 and the next prefetch address is based on the updated contents of NFAPD field 42.

During operation, the BRPD fields 40 and NFAPD fields 42 are updated in accordance with a specified update policy. For the sake of simplicity, only a single bit of information is used for the BRPD field 40. This means that the BRPD field 40 can assume one of two states, either "Branch Taken" or "Branch Not Taken". One possible update policy is best described using a number of examples, as provided below.

1. If the BRPD predicts "Branch Taken" and the NFAPD field contains the target address, and the actual branch is not taken, then the BRPD is updated to "Branch Not Taken" and the NFAPD is updated to the next sequential address.

2. If the BRPD predicts "Branch Taken", and the actual branch is taken, but the the NFAPD misses, then the NFAPD is updated to the target address of the branch instruction.
3. If the BRPD predicts "Branch Not Taken" and the NFAPD field contains the next sequential address, and the actual branch is taken, then the BRPD is updated to "Branch Taken" and the NFAPD is updated to the target address of the branch instruction.
4. If the BRPD predicts "Branch Not Taken", and the actual branch is not taken, but the NFAPD misses, the NFAPD is updated to the sequential address.
5. If the BRPD predicts "Branch Not Taken", and the actual branch is not taken, and the NFAPD provides the next sequential address, then the BRPD and NFAPD fields are not updated.
6. If the BRPD predicts "Branch Taken" and the actual branch is taken and the NFAPD provides the target address, then the BRPD and NFAPD fields are not updated.

In summary, the BRPD field and the NFAPD field are updated to the actual branch taken and actual next fetch address. In alternative embodiments, more sophisticated branch prediction algorithms may be used. For example, multiple bits may be used for the BRPD field 42, thereby providing finer granularity and more information about each branch prediction.

In one embodiment, a specific BRPD field 40 and a corresponding NFAPD field 42 is provided for each instruction per cache line 34 (i.e., n=m=k). As such, each branch instruction per cache line 34 enjoys the benefit of a dedicated branch prediction and next fetch address prediction as stored in BRPD field 40 and corresponding NFAPD field 42 respectively. In a simplified embodiment, one BRPD field 40 (i.e., m=1) and one NFAPD field 42 (i.e., k=1) is shared among all the instructions per cache line 34. With this embodiment, only the dominant instruction in the cache line 34 makes use of the branch prediction information and the next fetch address information. A dominant instruction is defined as the first branch instruction with a "Branch Taken" status in the cache line 34. Therefore, the BRPD contains a "Branch Taken" prediction and the corresponding NFAPD typically contains the target address for the dominating instruction. Since the dominant instruction is the first instruction in the cache line to cause a control transfer, it is not necessary for the other instructions to have their own BRPD fields 40 and NFAPD fields 42.

It will be appreciated that the number of BRPD fields 40 and NFAPD fields 42 is design dependent. As the number of BRPD fields 40 (m) and NFAPD fields 42 (k) increases toward the number of instructions (n) per cache line 34, the likelihood of branch and next fetch address prediction hits will increase. In contrast, as the number of BRPD fields 40 and NFAPD fields 42 approaches one, the likelihood of mispredictions increases, but the structure of cache 16 is simplified.

Figure 3:
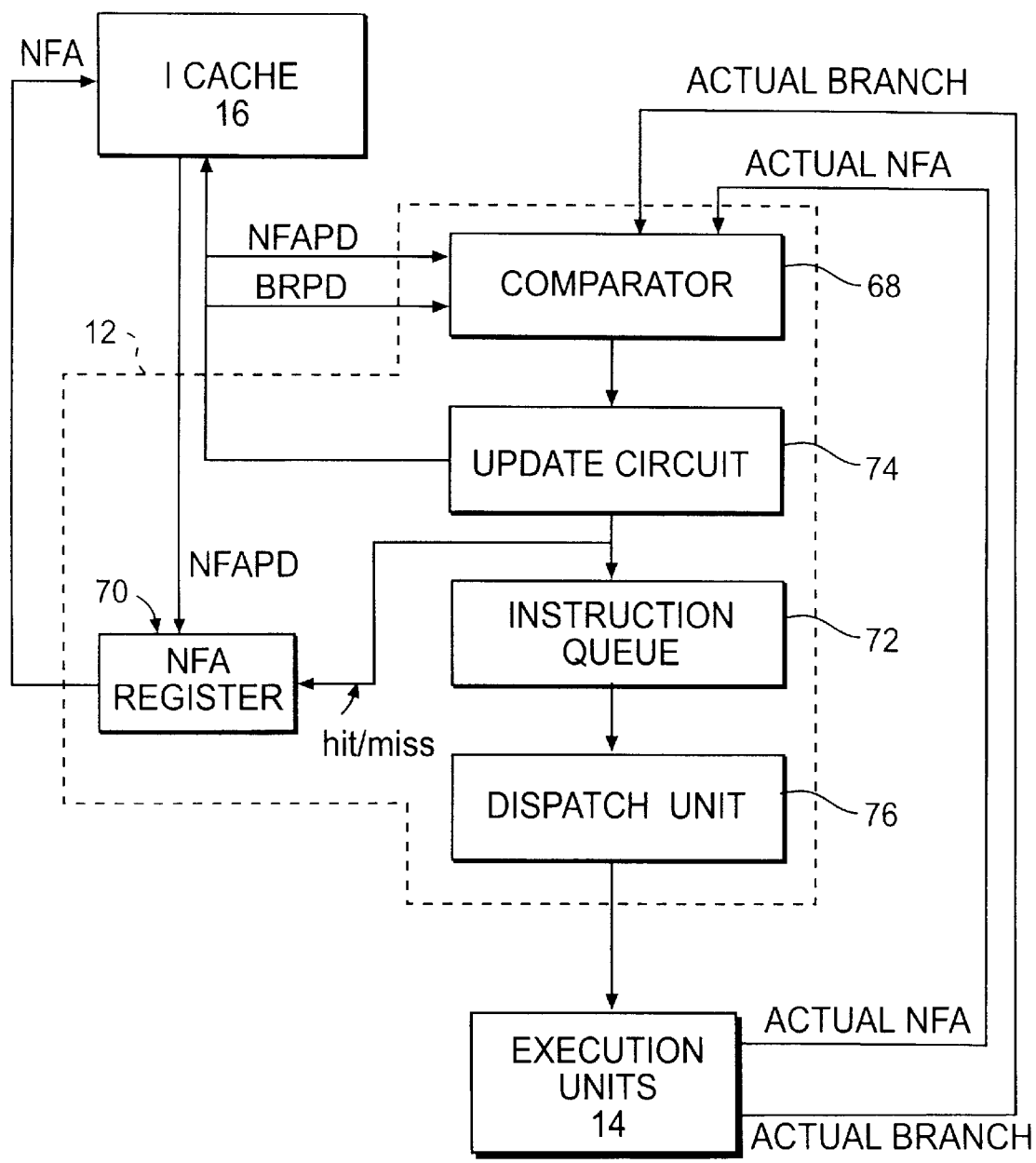
FIG. 3 illustrates a block diagram of an instruction prefetch and dispatch unit used in the computer system of the present invention.

Referring to FIG. 3, a block diagram of the pertinent sections of the prefetch and dispatch unit 12 are shown. The prefetch and dispatch unit 12 includes a comparator 68, a next fetch address (NFA) register 70, an instruction queue 72, an update unit 74, and a dispatch unit 76. For each instruction, the comparator 68 is coupled to receive the BRPD field 40 and the NFAPD field 42 information from instruction cache 16 and the actual branch direction and next fetch address from the execution units 14. It should be noted that the actual branch and next fetch address typically arrive at the comparator 68 at a later point in time since a certain period of time is needed for the actual branch to resolve in the execution units 14. The comparator 68 determines if the BRPD and the NFAPD are respectively correct, i.e., a hit. If the comparison yields a miss, the BRPD field and/or the NFAPD field 42 information is updated by update circuit 74 in accordance with the update policy described above. The updated BRPD and/or NFAPD information is then returned to the instruction cache 16. The actual NFA also is placed in the NFA register 70.

Figure 4A:
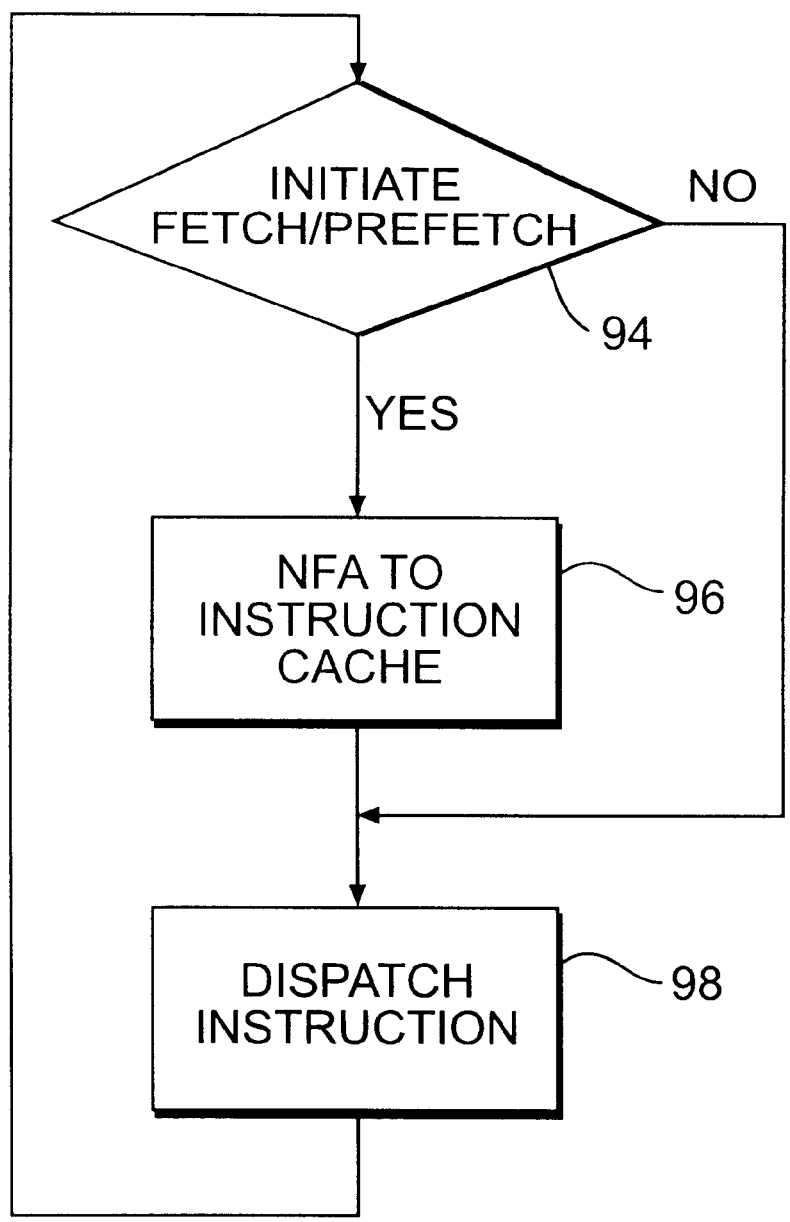
FIGS. 4a–4b are two flow diagrams illustrating the operation of the instruction prefetch and dispatch unit.
Figure 4B:
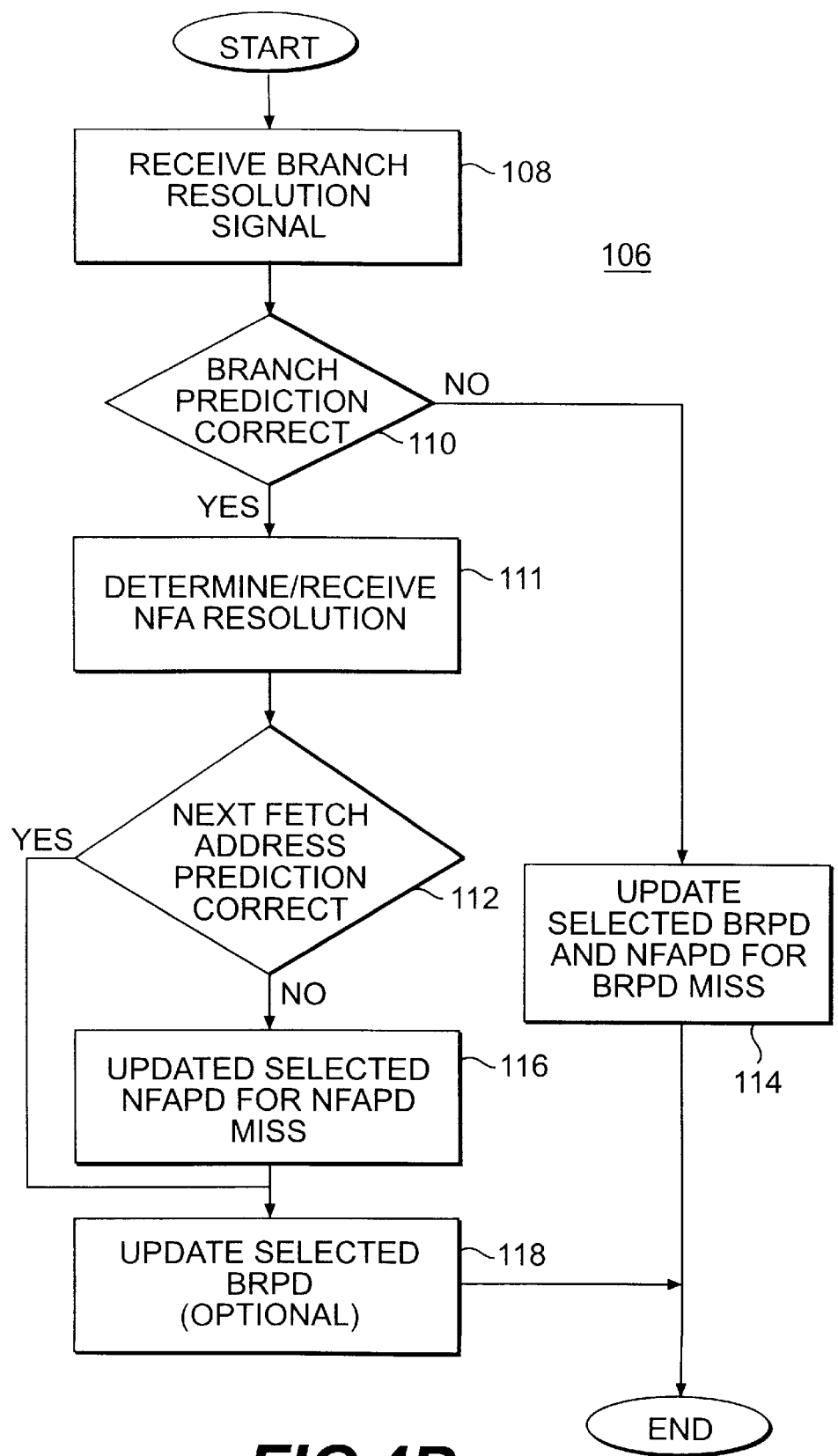

Referring now to FIG. 4a and FIG. 4b, two flow diagrams illustrating the operation of the prefetch and dispatch until 12 are shown. In FIG. 4a, the instruction prefetch and dispatch unit 12 determines if a fetch/prefetch should be initiated (block 94). If a fetch/prefetch should be initiated, the instruction prefetch and dispatch unit 12 uses the address stored in the NFA register 70 to fetch the next instruction from instruction cache 16 (block 96). In response, the instruction cache 16 provides the instruction prefetch and dispatch unit 12 with the requested instruction. The instruction is then placed into the instruction queue 72. Thereafter, the instruction is dispatched by dispatch unit 76. It should be noted that with each fetched instruction, the corresponding NFAPD value is placed in the NFA register 70 and is used to fetch the next instruction. When the comparator 68 determines that the NFAPD is incorrect, the actual NFA is placed into the NFA register 70, and the fetching of instructions resumes at the actual NFA. The instruction prefetch and dispatch unit repeats the above process steps until the instruction queue 72 is empty or the computer system is shut down.

As shown in FIG. 4b, the instruction prefetch and dispatch unit 12 also receives a branch resolution signal 200 (actual branch) as the branch instruction completes execution in the execution units 14 (block 108). The instruction prefetch and dispatch unit 12 then determines if the branch prediction is correct (diamond 110). If the predicted branch is incorrect, the instruction prefetch and dispatch unit 12 updates the selected BRPD field 40 and the NFAPD field 42 in accordance with the above-defined update policy (block 114). If the selected BRPD predicted the branch direction correctly, the instruction prefetch and dispatch unit 12 determines if the next address in the NFAPD field is correct (block 112). If the selected NFAPD predicted the next fetch address incorrectly, the instruction prefetch and dispatch unit 12 updates the NFAPD (block 116). If the NFAPD is correct, its status remains unchanged.

Referring now to FIG. 5, a flow diagram illustrating the operation of the instruction cache 16 is shown. The instruction cache 16 receives the fetch address from the instruction prefetch and dispatch unit 12 (block 74). In response, the instruction cache 16 determines if there is a cache hit (block 76). If there is a cache hit, selection logic 30, if necessary, selects and provides the appropriate set of instructions and the corresponding ICLASS field 44, BRPD field 40 and NFAPD field 42 information to the instruction prefetch and dispatch unit 12.

If there is a cache miss, the instruction cache 16 initiates a cache fill procedure (block 80). In one embodiment, the instructions accessed from memory 20 are provided directly to prefetch and dispatch unit 12. Alternatively, the instructions may be provided to the instruction prefetch and dispatch unit 12 after the cache line is filled in cache 16. As described earlier, the instructions are decoded to determine their class prior to being stored in the instruction cache 16. Additionally, the BRPD field 40 and NFAPD field 42 are initialized in accordance with the initialization policy of the branch and next fetch address prediction algorithm (block 86).

OPERATION

For the purpose of describing the operation of the present invention, several examples are provided. In the provided examples, there is only one (1) BRPD field 40 and NFAPD field 42 provided per cache line (i.e., m=k=1). For the purpose of simplifying the examples, the BRPD field 42 contains only 1 bit of information, and therefore can assume only two states; "Branch Taken" and "Branch Not Taken".

Referring to FIG. 6, several lines $34_1$–$34_7$ of the instruction cache 16 is shown. In this example, there are four instructions (n=4) per cache line 34. The four instructions are labeled, from left to right 4, 3, 2, 1, respectively, as illustrated in column 101 of the cache 16. A "1" bit indicates that the instruction in that position is a branch instruction. A "0" bit indicates that the instruction is some other type of instruction, but not a branch instruction. In column 103, the BRPD fields 40 for the cache lines 34 are provided. A single BRPD field 40 (m=1) is provided for the four instructions per cache line 34. In the BRPD field 40, a "0" value indicates a "Branch Not Taken" prediction and a "1" value indicates "Branch Taken" prediction. With this embodiment, the BRPD information provides the branch prediction only for the dominant instruction in the cache line. The column 105 contains the next fetch address in the NFAPD field 42. A single NFAPD field 42 (k=1) is provided for the four instructions per cache line 34. If the BRPD field 40 is set to "0", then the corresponding NFAPD field 42 contains the address of the next sequential instruction. On the other hand, if the BRPD field 40 contains a "1", then the corresponding NFAPD field 42 contains the target address of the dominant instruction in the cache line 34.

In the first cache line $34_1$, the four instructions are all non-branch instructions, as indicated by the four "0" in column 101. As such, the corresponding BRPD field 40 is set to "0" "Branch Not Taken" and the NFAPD field 42 is set to the sequential address.

The second and third cache lines $34_2$ and $34_3$ each include one branch instruction respectively. In the cache line $34_2$, the branch instruction is located in the first position, as indicated by the "1" in the first position of column 101. The corresponding BRPD field is set to "0", and NFAPD is set to "next sequ addr 1". Accordingly, the branch prediction is "Branch Not Taken", and the NFAPD is the next sequential address (i.e., $34_3$). In the third cache line $34_3$, the first instruction is a branch instruction. The corresponding BRPD field is set to "1", and NFAPD is set to "target addr 1". The branch prediction algorithm thus predicts "Branch Taken", and the next fetch address is the "target address 1" of the first instruction.

The fourth cache line $34_4$ and fifth cache line $35_5$ provide examples of cache lines 34 having two branch instructions. In both lines $34_4$ and $34_5$, the branch instructions are located in the first and third positions in column 101. With cache line $34_4$, both instructions have a branch prediction set to "Branch Not Taken", i.e., there are no dominant instructions. The corresponding field BRPD is therefore set to "0", and NFAPD is set to "next sequ addr".

In contrast, with the fifth cache line $35_5$, the branch prediction algorithm predicts "Branch Taken" for the first branch instruction. The first instruction in the cache $35_5$ is therefore the dominant instruction of the cache line. The corresponding BRPD field is set to "1", and NFAPD is set to "target addr 1". Since the dominant instruction will cause a control transfer, the branch prediction and next fetch address for the third instruction are not necessary.

The sixth $34_6$ and seventh $34_7$ cache lines provide two more examples of cache lines having two branch instructions. In both cache lines, the first and third instruction are branch instructions. In the sixth cache line $34_6$, the branch prediction is "Branch Not Taken", but the prediction for the second branch instruction is, "Branch Taken". Accordingly, the third instruction is considered the dominant instruction and the NFAPD field contains the target address for the third instruction of the line. Thus, BRPD is set to "1", and NFAPD is set to "target address 3". In the seventh cache line $34_7$, the branch prediction for both branch instructions is "Branch Taken". Since the first instruction is the dominant instruction of the line, the BRPD field is set to "Branch Taken" "1" and the NFAPD field is set to "target addr 1".

In embodiments where the number of BRPD fields 40 and NFAPD fields 42 equals the number of instructions per cache line 34 (i.e., m=n), the operation of the present invention is straight forward. The BRPD field 40 and the NFAPD field 42 for each branch instruction are used to predict the "Branch Taken" and next fetch address. Further, the BRPD field 40 and the NFAPD field 42 are updated in accordance with the outcome of the respective branch instruction when executed.

While the invention has been described in relationship to the embodiments shown in the accompanying figures, other alternatives, embodiments and modifications will be apparent to those skilled in the art. It is intended that the specification be only exemplary, and that the true scope and spirit of the invention be indicated by the following claims.

What is claimed is:

1. A computer system comprising:
   an instruction cache for storing a plurality of processor instructions, the instruction cache including
   an instruction array for storing the plurality of processor instructions;
   an instruction class array for storing an instruction class for each of the plurality of processor instructions; and
   a predictive annotation array for storing at least one prediction indicator for each of the plurality of processor instructions, wherein the instruction cache selectively refers to the predictive annotative array based upon the instruction class;
   a next address fetch array for storing at least one next fetch address, each next fetch address associated with at least one of the processor instructions stored in the instruction array and indicating a location of a processor instruction to be fetched;
   a next fetch address register, coupled to the instruction cache, for receiving a next fetch address associated with each processor instruction previously fetched from the instruction cache; and
   a fetch unit, coupled to the instruction cache and the next fetch address register, for fetching a processor instruction stored at a location indicated by each next fetch address received at the next fetch address register.

2. The computer system of claim 1, further comprising an execution unit, coupled to the prefetch and dispatch unit, for executing the first instruction after the prefetch and dispatch unit dispatches the first instruction to the execution unit.

3. The computer system of claim 1, wherein the next fetch address is a sequential address following the first instruction.

4. The computer system of claim 1, wherein a first instruction is a branch instruction and the instruction cache further comprises a branch prediction field for storing branch prediction information.

5. The computer system of claim 4, wherein the branch prediction information in the branch prediction field is for predicting branch not taken, and the next address fetch field is for storing the sequential address after the first instruction.

6. The computer system of claim 4, wherein the branch prediction information in the branch prediction field is for predicting branch taken, and the next address fetch field is for storing a target address of the first instruction.

7. The computer system of claim 4, wherein the branch prediction information is dynamically updated in accordance with a branch prediction algorithm.

8. The computer system of claim 1, further comprising an execution unit, coupled to the instruction cache, for executing a first instruction, the execution unit further including a resolve unit for resolving an actual next fetch address of the first instruction, and a compare circuit for comparing the actual next fetch address with the next fetch address contained in the next address fetch field associated with the first instruction.

9. The computer system of claim 8, further comprising a prefetch unit, coupled to the execution unit and the instruction cache, for fetching a second instruction corresponding to the actual next fetch address and providing the second instruction to the execution unit for execution if the compare circuit determines that the actual next fetch address of the first instruction and the next fetch address contained in the next address fetch field associated with the first instruction are different.

10. The computer system of claim 9, wherein execution of the computer program resumes at the second instruction if the compare circuit determines that the actual next fetch address of the first instruction and the next fetch address contained in the next address fetch field associated with the first instruction are different.

11. The computer system of claim 9, wherein the next address fetch field associated with the first instruction is updated with the actual next fetch address corresponding to the second instruction if the compare circuit determines that the actual next fetch address of the first instruction and the next fetch address contained in the next address fetch field associated with the first instruction are different.

12. The computer system of claim 1, wherein the fetched instruction is fetched from the instruction cache.

13. The computer system of claim 1, wherein the fetched instruction is fetched from memory if the fetched instruction is not in the instruction cache.

14. The computer system of claim 1, wherein the fetched instruction is fetched and speculatively dispatched into an execution unit for execution.

15. The computer system of claim 1, wherein the plurality of instructions stored in the instruction cache are arranged in a number of cache lines, each one of the number of cache lines including (n) of the plurality of instructions stored in the cache.

16. The computer system of claim 15, wherein each of the number of cache lines includes (k) of the next address fetch field addresses, where (k) is equal to or less than (n).

17. The computer system of claim 15, wherein each of the number of cache lines includes (m) branch prediction elements, where (m) is equal to or less than (n).

18. The computer system of claim 15, wherein each of the number of cache lines further includes a branch prediction field for storing branch prediction information for a dominating instruction among the (n) instructions in each of the number of cache lines in the instruction cache.

19. The computer system of claim 1, wherein the next fetch address stored in a next address fetch field associated with the first instruction is initialized in accordance with a predetermined policy when the first instruction is placed into the instruction cache from memory.

20. The computer system of claim 1, wherein the instruction cache further includes an instruction decode field for storing instruction decode information for a first instruction.

21. The computer system of claim 20, wherein the instruction decode information includes a class identifier for identifying the class of a first instruction.

22. The computer system of claim 1, wherein the next fetch address is a predicted next fetch address.

23. A method of providing a computer system comprising the steps of:

provinding an instruction cache for storing a plurality of processor instructions, the instruction cache including an instruction field for storing the plurality of processor instructions;

an instruction class array for storing an instruction class for each of the plurality of processor instructions;

a predictive annotation array for storing a prediction indicator for each of the plurality of processor instructions; and a next address fetch array for storing at least one next fetch address, each next fetch address associated with at least one of the processor instructions stored in the instruction array and indicating a location of a processor instructions to be fetched;

selectively referring to the predictive annotative array based upon the instruction class;

providing a next fetch address register, coupled to the instruction cache, for receiving a next fetch address associated with each processor instruction previously fetched from the instruction cache; and providing a fetch unit, coupled to the instruction cache and the next fetch address register, for fetching a processor instruction stored at a location indicated by each next fetch address received at the next fetch address register.

24. The method of claim 23, further comprising the step of providing an execution unit, coupled to the prefetch and dispatch unit, for executing the first instruction after the prefetch and dispatch unit dispatches the first instruction to the execution unit.

25. A method of fetching instructions, comprising the steps of:

fetching a first instruction stored in an instruction cache;

providing an instruction class for the first instruction;

selectively referring to a predictive annotative array based upon the instruction class of the first instruction;

unconditionally storing, in a next fetch address register coupled to the instruction cache, a next fetch address associated with the first instruction; and unconditionally fetching a second instruction stored at a location indicated by the next fetch address stored in the next fetch address register.

\* \* \* \* \*

UNITED STATES PATENT AND TRADEMARK OFFICE
CERTIFICATE OF CORRECTION

PATENT NO. : 6,304,961 B1
DATED : October 16, 2001
INVENTOR(S) : Robert Yung et al.

It is certified that error appears in the above-identified patent and that said Letters Patent is hereby corrected as shown below:

<u>Column 10, claim 19,</u>
Line 2, "a next" should read -- the next --;
Line 3, "the first" should read -- a first --.

Signed and Sealed this

Nineteenth Day of March, 2002

*Attest:*

*Attesting Officer*

JAMES E. ROGAN
*Director of the United States Patent and Trademark Office*